United States Patent [19]

Peterson

[11] 3,838,521

[45] Oct. 1, 1974

[54] TOOL SETTING FIXTURE

[75] Inventor: Bertil G. Peterson, Bloomington, Minn.

[73] Assignee: Tobin-Arp Manufacturing Company, Minneapolis, Minn.

[22] Filed: Apr. 2, 1973

[21] Appl. No.: 347,174

Related U.S. Application Data

[63] Continuation-in-part of Ser. No. 111,354, Feb. 1, 1971, Pat. No. 3,728,940.

[52] U.S. Cl.................. 33/185 R, 33/201, 82/1 A
[51] Int. Cl....... B27g 23/00, G01b 5/20, B23b 3/00
[58] Field of Search............ 82/1, 1 A; 33/185, 201

[56] References Cited
UNITED STATES PATENTS

| 2,700,827 | 2/1955 | Rowe et al. | 33/185 R |
|---|---|---|---|
| 3,518,769 | 7/1970 | Bullard et al. | 33/185 R |
| 3,546,781 | 12/1970 | Cox et al. | 33/185 R |
| 3,676,935 | 7/1972 | Klausing | 33/185 R |
| 3,701,199 | 10/1972 | Lewis | 33/185 R |

Primary Examiner—Harrison L. Hinson

[57] ABSTRACT

Tool bits are precisely positioned on a boring head so as to be able to cut into an engine casting a valve seat face and inner and outer adjacent clearance faces all having an exactly predetermined transverse profile with respect to the axis of the boring head. The tool setting fixture for so positioning the bits has an arbor on which the boring head is positioned. A tool setting stop on the fixture defines the desired seat face, and the stop is positioned on the fixture so that its seat face profile is related to the arbor axis exactly as the profile of the desired valve seat working face is related to the valve stem axis. A first tool bit is positioned to have its cutting edge flush against this tool setting stop seat face, and the second and third cutting edges of other tool bits are each positioned to have a cutting edge in contact with a separate edge corner of this seat face.

4 Claims, 16 Drawing Figures

TOOL SETTING FIXTURE

This application is a continuation-in-part of my application Ser. No. 111,354; filed Feb. 1, 1971, now U.S. Pat. No. 3,728,940, granted Apr. 24, 1973. The disclosure of that application is incorporated herein by this reference.

BACKGROUND OF THE INVENTION

In the reworking of automotive engines it is often necessary or desirable to reform that surface of the cylinder head or engine block which actually contacts the engine valve as the valve travels between open and closed conditions. This surface is herein referred to as the valve seat working face. This reworking can be done by further removal of metal in the cylinder head or block or by the replacement of an entire valve seat insert with subsequent removal of new metal to form the desired valve seat profile. In addition to the valve seat working face itself, it is often necessary or desirable to perform an upper clearance cut by removing material between the valve seat working face and the outside of the cylinder head and a lower clearance cut by removing material on the side of the valve seat working face opposite the outside of the cylinder head. Thus the complete valve seat will define three conical concentric surfaces and have a three face transverse profile.

In order to insure proper functioning of the reassembled valve with respect to the valve seat, it is imperative that the new valve seat working face be in precise concentric alignment with the opening in the cylinder head for the stem of the valve which is to operate against the seat.

This has been done by supporting a single tool bit in a boring bar mounted on a machine tool for rotation about the boring bar axis, then attempting to exactly align the boring bar axis with the valve stem opening axis, and next causing the machine tool to rotate the boring bar and to move the bit down into contact with the cylinder head to cut the desired valve seat working face. When this has been accomplished, another tool bit can be supported in a boring bar in the same machine tool with the same alignment of parts, and this tool bit can be used to make the lower clearance cut, for example. Yet another tool bit can be utilized similarly to make the upper clearance cut.

This method has a number of obvious disadvantages including the difficulty of getting the proper instrumentation into the valve seat opening on the cylinder head in order to determine if and when the desired valve seat profile has been obtained. Similarly, it is extremely difficult to know when to stop the upper and lower clearance cuts to leave exactly the desired length of the profile of the valve seat working face and the exact desired relationship of the valve seat to the axis of the valve stem opening situated down below in the cylinder head.

It is also known to support arbors in valve stem openings in engine castings and to mount grinding wheels to rotate on the valve stem axis on such arbors. These grinding wheels, however, must be carefully dressed to attempt to provide precisely the desired face profile of the clearance or relief cuts and of the valve seat working face cut. The flat angles used in making these cuts, however, present difficulties when using grinding wheels, as the wheels tend to seize or grab in the cylinder head or other engine casting, thus often causing extensive damage to the valve seat under formation. A further difficulty with grinders is, of course, that of keeping the grinding faces constantly dressed so as to be of precisely the proper shapes. Also, because of the sophistication of these shapes, it is necessary to employ three separate grinding wheels consecutively to obtain the desired three face profile.

As suggested above, all of the methods employed to accomplish the desired results have, before the present invention, required that measurements be attempted inside of the cylinder head not only to verify the shape obtained after the fact, but in order to set up the tools properly for performing the operation and also to check the progress of the operation while it is happening.

BRIEF SUMMARY OF THE INVENTION

The method for cutting valve seats in automotive engine castings such as cylinder heads and engine blocks as disclosed herein has been developed to overcome the difficulties in the prior art. This method includes precisely positioning three tool bits in a boring head by use of the tool setting fixture of the invention.

The tool setting fixture has an arbor opening therethrough and a tool setting arbor to be positioned in that opening. This arbor has an outer cylindrical surface to support the aforementioned boring head. A tool setting stop is supported on the fixture and defines a plane face which exactly duplicates the desired profile of the valve seat working face. This tool setting stop is fixedly positioned on the fixture to precisely relate the plane stop face to the fixture arbor axis exactly as the profile of the desired valve seat working face is to relate to the valve stem axis.

In a first form of the invention, the positioning of this tool setting stop on the fixture is determined by reference to indicia and an index on the stop and on the fixture which indicate the distance between the plane face of the tool setting stop and the axis of the fixture arbor. In a second form of the invention, with the fixture arbor removed, a poppet valve of the same size as the valve for which the valve seat working face is to be cut is positioned to have its axis parallel to the eventual position of the fixture arbor axis, and the plane face of the tool setting stop is positoned in precise flush alignment with the conical valve working face.

With the tool setting stop properly positioned and the fixture arbor installed on the fixture, the boring head is situated on the fixture arbor in such a manner as to permit rotative movement with respect to the arbor as desired, but to limit any longitudinal movement along the arbor axis. The arbor itself is initially adjustable longitudinally with respect to the fixture, however. A first of the tool bits is locked in the boring head to position its cutting edge in precise flush alignment with the plane face of the tool setting stop while said cutting edge lies in a plane coincident with the arbor axis. A second tool bit is next positioned with its cutting edge in that plane and in contact with a first corner of the plane stop face and is locked in position, and a third tool bit is similarly positioned against a second corner of the plane face and is locked into place.

The boring head is then removed from the fixture arbor and is positioned on an arbor which is concentrically mounted in the valve stem opening of an engine casting, and a drive means is aligned with the axis of that arbor and affixed to the boring head from above. This driving means then rotates the boring head and forces it down into the automotive engine casting toward the valve stem opening to cause the desired cuts to be made. This process is continued until such time as precisely the desired valve seat profile has been cut out.

Because the exact dimensions of the valve seat profile have been set by the positioning of the tool bits before the boring head is placed in boring position with respect to the engine casting, and because the boring head is mounted concentrically with the valve stem opening, the only measurement which need be made of the valve seat working face inside of the casting is to determine whether or not the longitudinal spacing of the new valve seat working face with respect to a reference point on the engine casting is within the desired limits. The completeness of the upper and lower clearance face cuts can be determined by visual inspection, and any other measurements down inside of the engine casting as to angle, length, shape and concentricity of the valve seat working face with the valve stem opening are merely for the purpose of checking the accuracy of work.

DESCRIPTION OF THE PREFERRED EMBODIMENTS

I. Method and Apparatus for Performing Cuts

A boring head assembly 10 includes a boring head 12, first tool bit 14, second tool bit 16, and a third tool bit 18, together with means, indicated generally at 11, for rigidly and adjustably attaching the tool bits to the boring head. The boring head 12 is provided with a cylindrical arbor opening 19 extending therethrough. A part spherical knob 21 is integral with and forms the drive end of the boring head 12. Drive pins 23, 23 extend outwardly from this spherical knob, but do not extend into the cylindrical wall of the arbor opening 19.

Figures 1, 2:
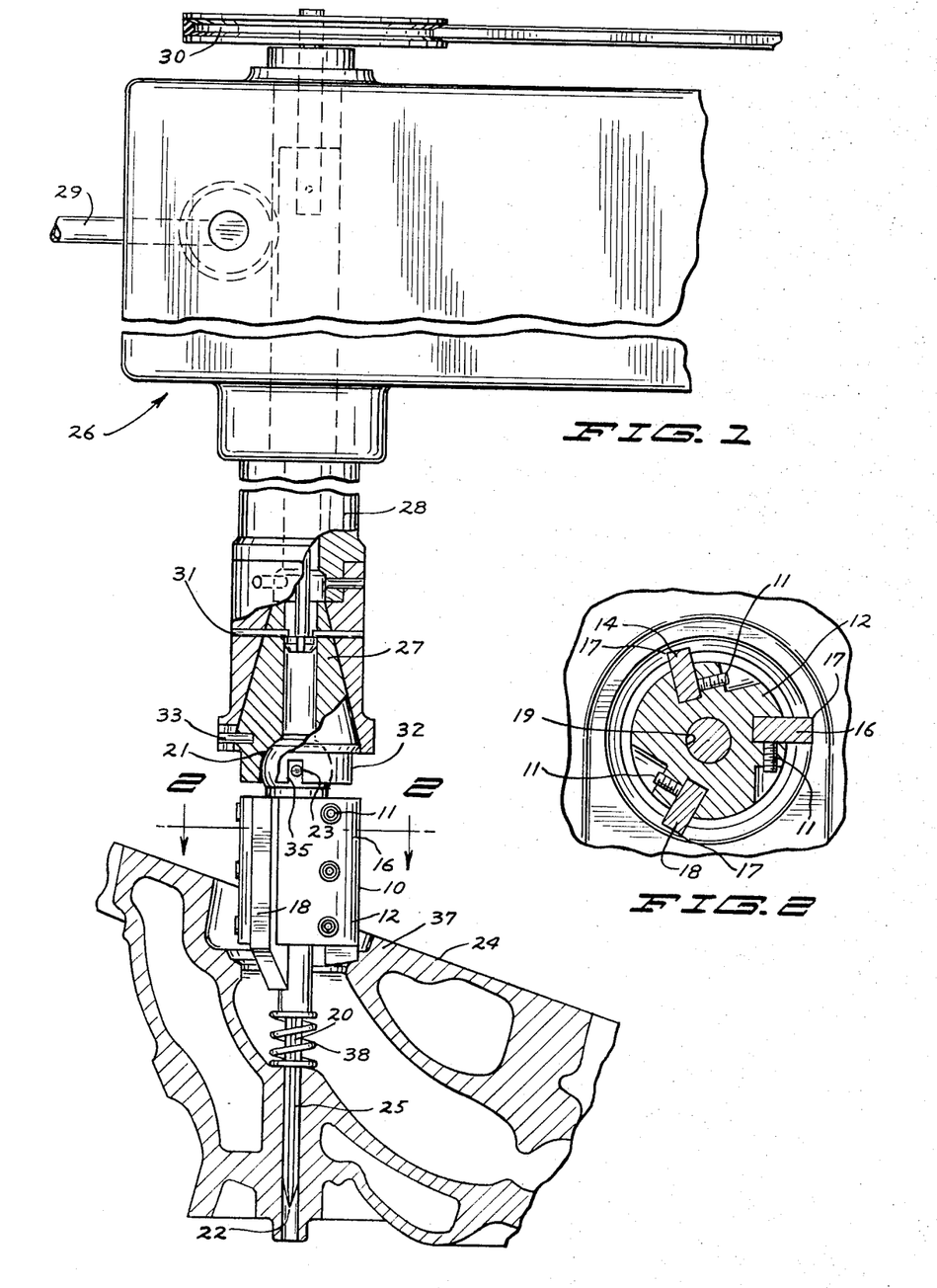
FIG. 1 is a vertical cross sectional view of a fragment of an automotive cylinder head showing a boring head and tool bits of the invention rotatably mounted on a cylindrical arbor which is positioned in exact concentric alignment with a valve stem opening in that cylinder head, and showing driving means for rotating the boring head.
FIG. 2 is an enlarged horizontal sectional view taken on the line 2—2 in FIG. 1.

An arbor 20 is mounted, as best seen in FIG. 1, in a valve stem opening 22 of an automotive engine cylinder head 24 on tapered splines 25, or in any usual or preferred manner. This mounting means, per se, forms no part of the invention.

A machine tool 26, somewhat in the nature of a drill press, has a bed, not shown, which is positioned below the cylinder head 24. This machine tool includes a rotatable spindle 28 which may be raised or lowered through the instrumentality of an arm 29 in any usual or preferred manner. The spindle is rotatably powered through a pulley 30 from a power source (not shown). A conical drive cap 27 is fastened up inside of the spindle 28 by means of pins 31, and a drive pin 33 connects the drive cap 27 for rotation with the driven spindle 28. This conical drive cap is provided with a cylindrical sleeve 32 integral therewith and extending downwardly therefrom. This sleeve is provided with a pair of slots 35, 35 (one is shown) which loosely fit over the drive pins 23 of the part cylindrical knob 21.

The axis of the rotatable spindle 28 is precisely aligned with the axis of the spline mounted arbor 20 in any usual or preferred manner forming no part of the invention.

In order to have control over the descent of the boring head assembly including the bits 14, 16 and 18 toward a valve seat region 37 of the cylinder head 24, a compression coil spring 38 is situated around the arbor 20 between cylinder head 24 and boring head 12. Thus, as the spindle 28 of the machine tool 26 is rotated at a speed suitable to perform the cuts in the cylinder head, the arm 29 is operated to force the spindle and the boring head down against the action of the spring 38 and into cutting contact with the engine head casting.

Assuming that there are three tool bits precisely positioned around the boring head, a cut will be made in the cylinder head in the valve seat region 37 to form a valve seat working face and to form upper and lower clearance faces exactly as desired. As soon as the boring head assembly can be seen cutting into the cylinder head for the full width of the desired valve seat working face, the downward pressure on the spindle 28 can be eliminated, and the desired valve seat has been achieved.

II. Apparatus for Setting Boring Head Assembly.

As seen in FIGS. 6 through 11, in order to precisely position the three tool bits in the boring head, a first form of tool setting fixture 40 is provided. This fixture includes a main casting 41 in which there is mounted a tool setting arbor 42 having an outwardly extending cylindrical first shank 44 of the same diameter as the spline mounted arbor 20, and having a second shank 45 of larger diameter extending through an arbor support surface or arbor opening provided in the casting 41. A set screw 43 is rotatably mounted on the casting 41 to temporarily fixedly position the tool setting arbor 42 after the desired longitudinal adjustment of this arbor with respect to the opening in the casting 41 has been made.

Figure 6:
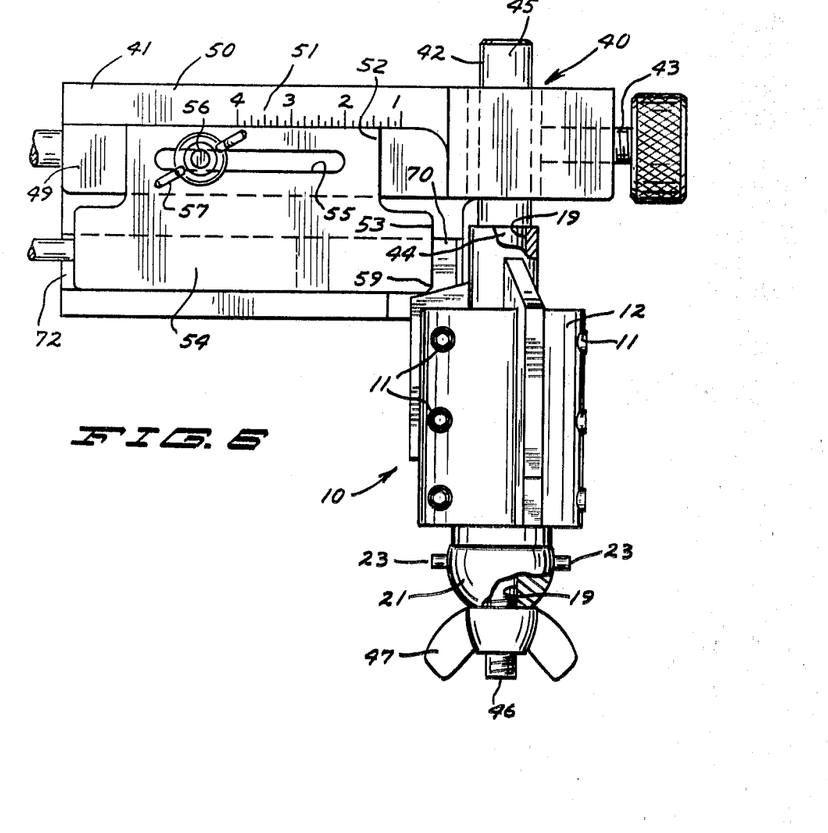
FIG. 6 is a top plan view of a tool setting fixture according to a first form of the present invention with a tool setting fixture arbor and with a boring head installed thereon.
Figure 7:
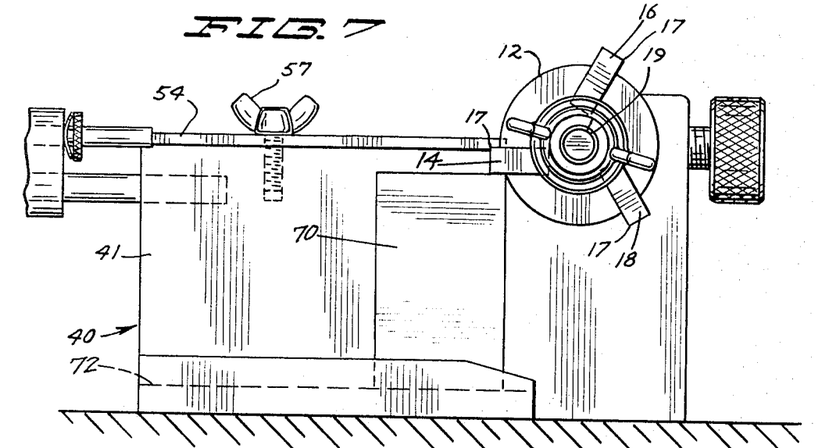
FIG. 7 is a front elevational view of the tool setting fixture and parts as seen in FIG. 6.

The outer end of the cylindrical shank 44 is provided with screw threads 46. The length of this shank is such that the boring head assembly can be positioned on it and a butterfly nut 47 can be screwed down against the knob 21 of the boring head, forcing the opposite end of the boring head to bottom against enlarged shank 45, to temporarily fixedly position the boring head on the arbor.

As probably best seen in FIGS. 2 and 7, the cutting edges 17 of each of the tool bits positioned in the boring head lie in a plane coincident with the axis of the boring head. In order to precisely position each of these cutting edges, it is necessary that the measurement be ascertained in such a plane. When the boring head is on the tool setting arbor 42, each such plane is coincident with the axis of that arbor. In the form of the invention shown, a flat horizontal surface 49 is provided on the top of the main casting 41 in a plane just slightly below a horizontal plane passing through and coincident with the tool setting arbor axis. Adjacent to this flat surface 49 along a line perpendicular to the arbor axis is a slightly raised portion 50 of the casting 41, this portion having indicia 51 along the edge thereof adjacent the flat surface 49.

A tool setting stop 54 is constituted here as a plate, is slideably situated in contact with the surface 49 and is provided with a slot 55 in which a threaded stud is situated. This stud is integral with and extends upwardly from the casting 41 through the surface 49. The stop plate is slideable along the surface 49 in direction at right angles to the axis of the tool setting arbor 42. A butterfly nut 57 is provided on the threaded stud 46 and is for the purpose of locking the stop 54 in position after said position is determined and achieved.

Figure 8:
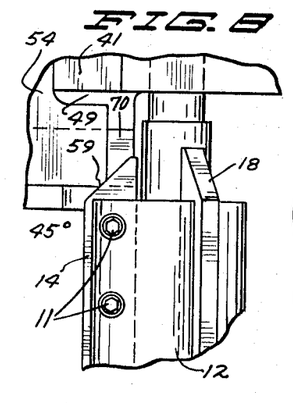
FIG. 8 is a fragmentary view of the fixture and parts as seen in FIG. 6 but showing the relationship of the first tool bit to a tool setting stop having a plane corner face shaped to simulate the profile of the desired valve seat working face.
Figure 9:
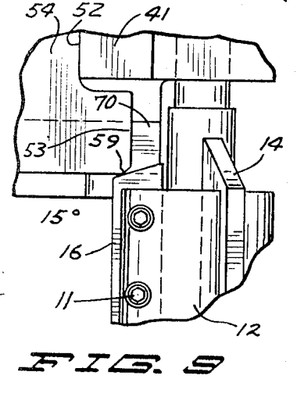
FIG. 9 is a fragmentary view of the fixture and parts as seen in FIG. 8 but showing the relationship of the second tool bit to an outer corner of the plane face on the tool setting stop.
Figure 10:
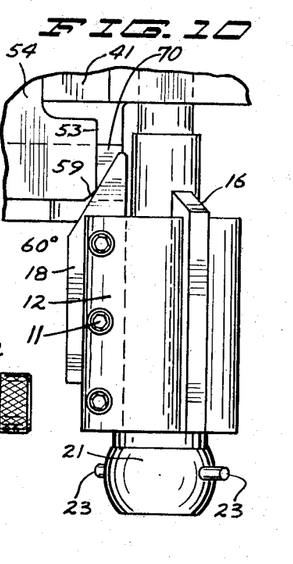
FIG. 10 is a fragmentary view of the parts as seen in FIGS. 8 and 9 but showing the relationship of a third tool bit to an inner corner of the plane stop face on the tool setting stop.

As perhaps best seen in FIGS. 8, 9 and 10, the lower right hand edge corner of the tool setting stop (as seen in those figures) is cut off or truncated. As shown, this defines a plane stop face 59 situated at 45° to both the edge of the stop parallel to the axis of the arbor and also to the edge of the stop perpendicular to the axis of the arbor. This plane face 59 will be constituted as having exactly the length of the desired transverse profile of the valve seat working face, and the tool setting stop 54 will be positioned so that the relationship of this plane stop face 59 to the axis of the arbor 42 will be exactly identical to the desired relationship of the valve seat working face to the axis of the valve stem in the cylinder head.

While a plane face 59 having an axis of 45° to a plane perpendicular to the axis of the arbor is shown, it is to be understood that a plurality of tool setting stops 54 can be provided, each having a corresponding truncated plate face such as 59 in the angular relationship specified by the engine manufacturer for his valve seat working face with respect to a plane perpendicular to the axis of his valve and valve stem. For example, the tool setting stop having one edge cut off at an angle of 45° with a face 1/16 inch long and the other edge being cut off at an angle of 45° and having a face 3/32 inch long together with a second stop having a face at an angle of 30° with respect to a plane perpendicular to the arbor axis, that face being 1/16 inch long and a second corner of the second stop being cut off to provide a 30° face 3/32 inch long would take care of all or the great bulk of the valve seat working face dimensions being specified by manufacturers of automotive engines today.

In order to properly position the plane face 59 of the stop 54, the indicia 51 on raised portion 50 of the fixture 40 and an index edge 52 of stop plate 54 are related in terms of the positioning of a right edge 53 of the stop plate as seen in FIGS. 6 through 11 with respect to the axis of the boring head and the arbor 42. As shown, this index reads on the indicia in inches of diameter. Assuming by way of example that the valve seat working face is to be conical with the interior edge thereof 1 ⅝ inches in diameter and that the profile is to be 1/16 inch long, stop plate 54 will be positioned as seen in FIG. 6, and the butterfly nut 57 will be used to temporarily fasten it in that position.

Figure 11:
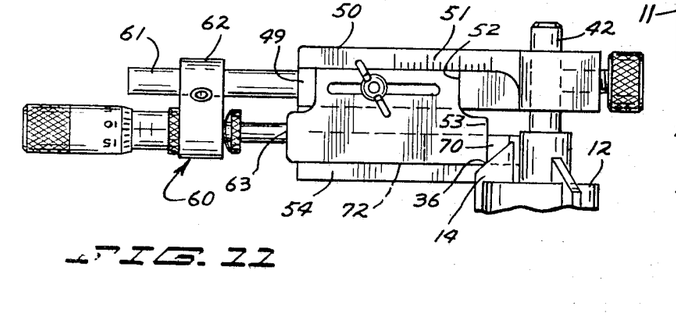
FIG. 11 is a top plan view in reduced scale showing the first form of tool setting fixture, the boring head and tool setting fixture arbor in relationship to a micrometer permanently attached to the tool setting fixture to accurately determine the positioning of the tool setting stop with respect to the axis of said arbor.

In order to even more accurately position the parts, a micrometer 60 is mounted on a shaft 61 extending outwardly from the main casting 41 and on a bar 62 fastened to that shaft. The micrometer is calibrated so that an end surface 63 thereof bears against the tool setting stop 54 to exactly position the plane stop face 59 with respect to the axis of the arbor 42.

In the setting of the first tool bit 14, it is important, as pointed out above, that the cutting edge 17 thereof is positioned in a plane coincident with the arbor axis. This is done by providing a lap block 70 in sliding relationship with respect to a groove 72 in the main casting 41 of the tool setting fixture 40. The bottom of this groove is constituted as a plane in exact parallel relationship to the horizontal surface 49 of the main casting, and the block 70 is slideable on that surface into and out of clearing relationship with respect to the tool bits. As best seen in FIG. 7, with the butterfly nut 47 loosened, the boring head 12 will be rotated to bring the bottom surface of the tool bit 14 against the top surface of the block 70, thus (as seen in FIG. 7) positioning the upper left hand corner or cutting edge 17 of that bit in exact horizontal alignment with the axis of the boring head 12 and the arbor 40. This positioning of parts is also seen in FIG. 8. The fastening means 11 will be loosened to allow the first tool bit 14 to be moved in this horizontal plane with respect to the boring head 12, and the cutting edge 17 thereof will be brought into flush relationship to the plane face 59 as seen in FIG. 8. The fastening means 11 will then be utilized to lock the bit in the boring head in that position.

Next the block 70 will be temporarily moved to the left from the position as seen in FIG. 7 and the boring head will be rotated in a counterclockwise direction to allow the passage of the first tool bit in downward direction. The block 70 will be put back into position so that the second tool bit 16 will come to rest on top of it. This positioning of the parts is seen in FIG. 9. The second tool bit will then be slid with respect to the boring head 12 until it contacts the lower left hand corner of the plane face 59 as seen in FIG. 9, and the bit locked to the boring head.

The same procedure will be utilized to position the third tool bit 18 against the upper corner of the plane stop face 59 as seen in FIG. 10.

As seen in FIGS. 12 through 16, in order to precisely position the three tool bits in the boring head, a second form of tool setting fixture 80 is provided. This fixture includes a main casting 81 in which a tool setting arbor 42 may be mounted. In place of the cylindrical arbor opening which was provided in casting 41, an arbor support surface in the form of a V-saddle 83 is provided in the main casting 41 of the second form of tool setting fixture 80. An arm 84 extends integrally upwardly from the casting and out over the V-saddle in position to rotatably support a set screw 85 positioned to be in exact alignment with the center of the sidewalls of the V-saddle.

Figure 14:
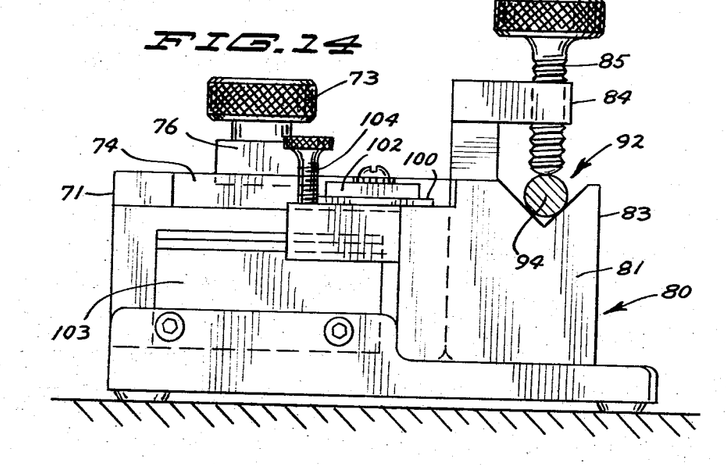
FIG. 14 is a front elevational view of the tool setting fixture and parts as seen in FIGS. 12 and 13, but with the valve portion of the poppet valve broken away to show the relationship of the valve stem to the fixture.
Figure 15:
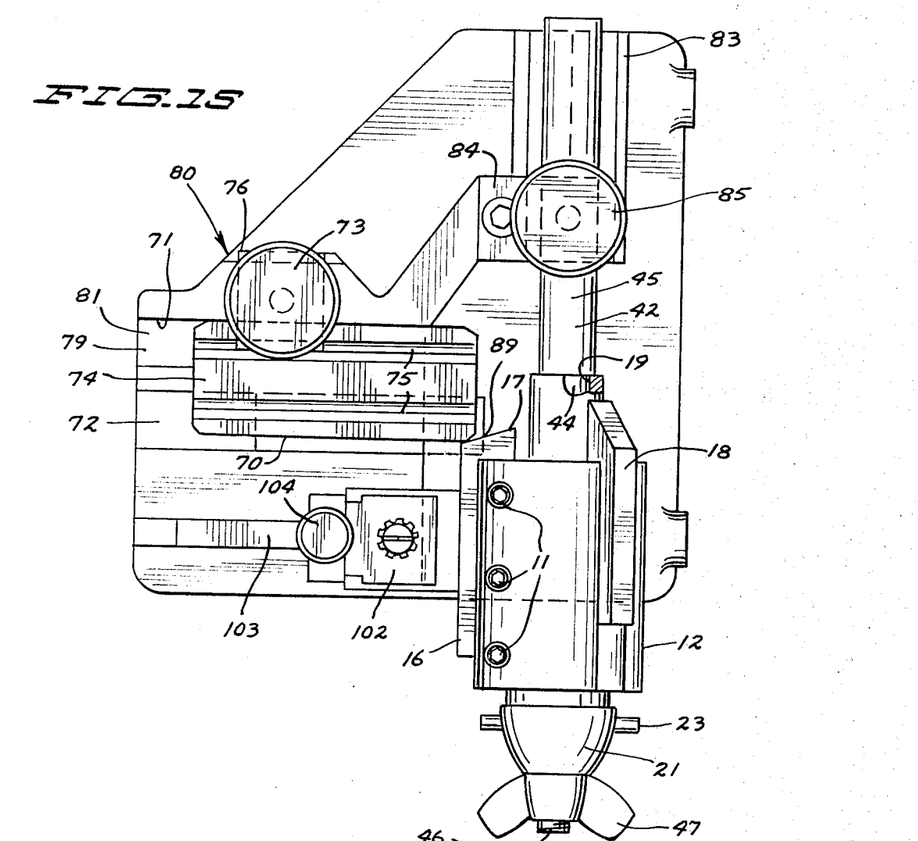
FIG. 15 is a top plan view of the tool setting fixture of the second form of the invention as seen in FIG. 12 but with a tool setting fixture arbor mounted on the fixture and with a boring head installed on the arbor.
Figure 16:
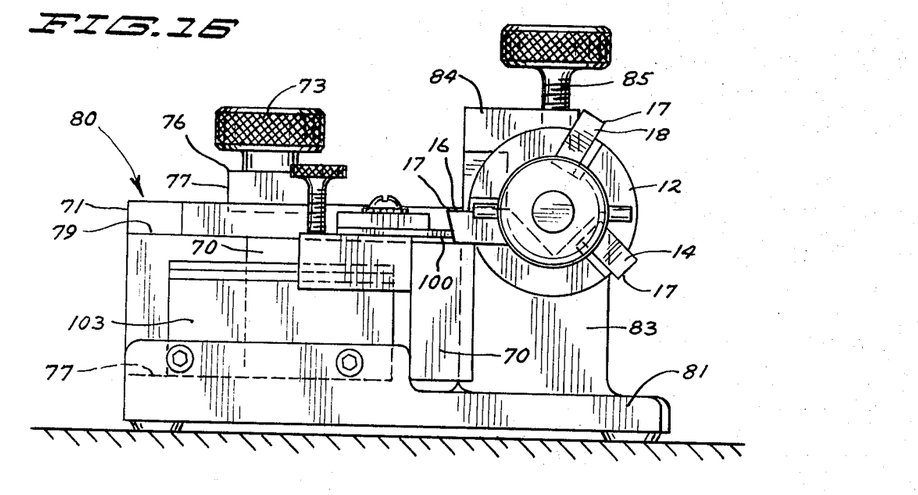
FIG. 16 is a front elevational view of the tool setting fixture and parts as seen in FIG. 15.

As seen in FIGS. 15 and 16, the same tool setting arbor 42 described in connection with the first form of tool setting fixture 40 can be supported in the second form of fixture 80. Enlarged shank 45 of the arbor 42 is positioned in the V-saddle 83, and after having been adjusted for the proper longitudinal relationship of the arbor 42 with respect to the fixture 80 is temporarily fixedly held in place in the V-saddle through the instrumentality of the set screw 85. The boring head 12 will be supported on the outwardly extending cylindrical shank 44 and will be held in position by the butterfly nut 47 operating on screw thread 46 in the same manner as described in connection with the first form of the fixture as seen in FIGS. 6 through 11. In the structure shown in FIGS. 12 through 16, however, a different form of tool setting stop plate 74 is used. This plate is slideably situated in contact with a flat horizontal surface 79 provided on the main casting 81. Surface 79 is slightly below a horizontal plane coincident with the tool setting arbor axis.

Figure 12:
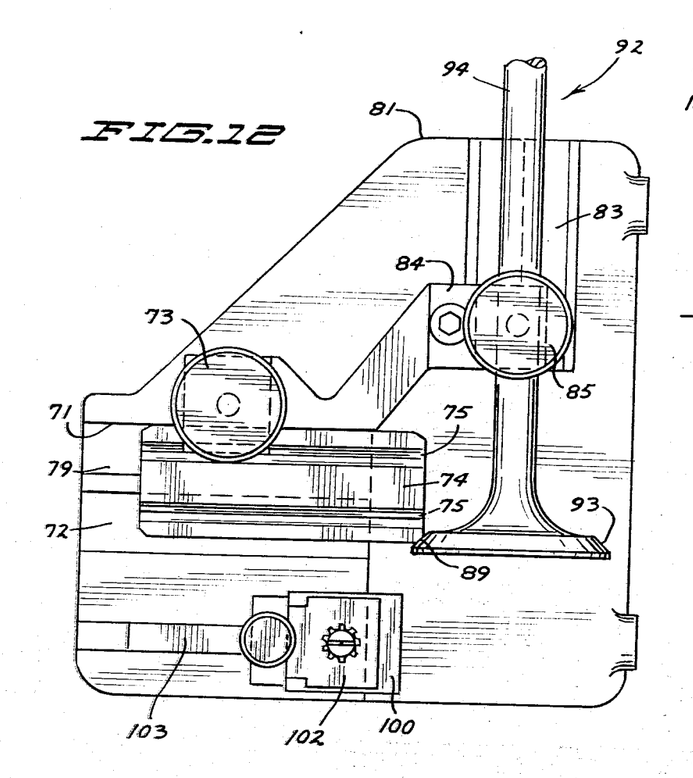
FIG. 12 is a top plan view of a tool setting fixture according to a second form of the present invention with a poppet valve installed thereon.

The tool setting stop 74 is provided with longitudinally extending grooves 75. A tool setting stop plate clamp arm 76 is situated above the casting 81 and a stop plate clam nut 73 extends down through the clam arm 76 and is threadably mounted in the top of the casting 81. The clamp arm 76 has a locking finger 77 which extends into one of the grooves 75. When the stop plate clamp nut 73 is turned down toward the plate clamp arm 76, finger 77 in groove 75 clamps the tool setting stop plate 74 in position. A shoulder 71 provided by casting 81 extends upwardly from the flat horizontal surface 79 and provides a surface against which the tool setting stop plate 74 is aligned to insure its precise positioning with respect to the tool setting fixture 80.

As seen in FIGS. 12 and 15, the lower right hand edge of the tool setting stop plate 74, as seen in those figures, is cut off or truncated. This defines a plane stop face 89 situated at 45° to both the edge of the stop parallel to the axis of the arbor and also the edge of the stop perpendicular to the axis of the tool setting arbor 42. This plane face 89 will be constituted as having exactly the length of the desired transverse profile of the valve seat working face, and the tool setting stop 74 will be positioned so that the relationship of this plane stop face 89 to the axis of the arbor 42 will be exactly identical to the desired relationship of the valve seat working face to the axis of the valve stem in the cylinder head.

It is to be noted that the tool setting stop plate can be turned end for end and can be turned over so that it can provide a plurality of tool setting stop faces, each corner having a corresponding truncated plate face such as 89 in an angular relationship specified by an engine manufacturer for his valve seat working face with respect to a plane perpendicular to the axis of his valve stem. For example, the tool setting stop can have one corner cut off at an angle of 45° with a face 1/16 inch long, another corner cut off at an angle of 45° and having a face 3/32 inch long. Yet another corner can have a stop face at an angle of 30° with respect to a plane perpendicular to the arbor axis, that face being 1/16 inch long and still a fourth corner can be cut off to provide a 30° face 3/32 inch long. Such settings would take care of all or the great bulk of the valve seat working face dimensions being specified by manufacturers of automotive engines today. By providing still further tool setting stop plates 74 with other truncated corner dimensions, other settings could be obtained for the bits in the boring heads of the invention.

Figure 13:
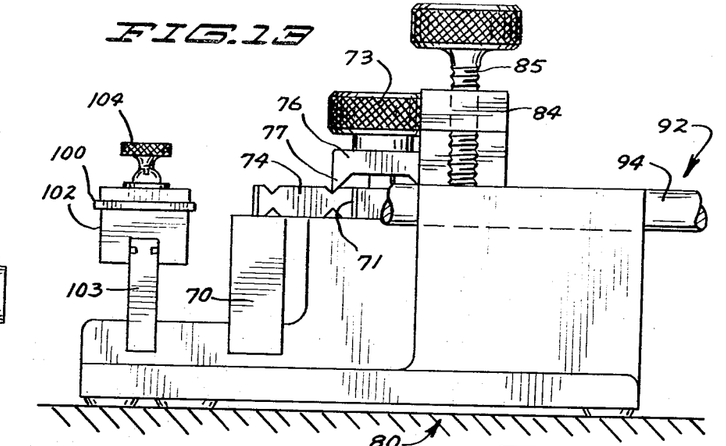
FIG. 13 is a side elevational view of the tool setting fixture and parts as seen in FIG. 12.

Instead of utilizing indicia or a micrometer to ascertain the proper setting of the tool setting stop plate 74 with respect to the tool setting fixture casting 81, an actual poppet valve 92 such as is to be used against the valve seat being cut, recut or reconditioned, or a poppet valve identical in configuration to such a valve, is used as seen in FIGS. 12 through 14.

In order to position the tool setting stop plate 74 using poppet valve 92, having a conical valve working face 93 and a valve stem 94, the set screw 85 is backed off to allow the tool setting arbor 42 to be removed from the fixture 80. The valve stem 94 is situated in the V-saddle, and the set screw 85 is again tightened to temporarily fixedly position the poppet valve with respect to the casting 81.

The tool setting stop plate having a plane stop face 89 of the same angular relationship as that of the conical valve working face 93 is positioned on the upper flat horizontal surface 79 of the casting 81, against shoulder 71, and is slid forward toward the poppet valve until the plane stop face 89 is in flush relationship to a desired portion of the conical valve working face 93. The set screw 85 can be loosened and the valve stem 94 slid longitudinally in the V-saddle in order to achieve the proper relationship of the parts.

By providing sufficient thickness to the valve setting stop plate and specifically to the plane stop face 89, it is possible to get exactly correct positioning of the parts as long as the stop face extends from position at least as low as a horizontal plane coincident with the axis of the smallest valve stem or tool setting arbor and at least as high as a horizontal plane coincident with the axis of the largest tool setting arbor or valve stem.

When the proper positioning of the tool setting stop plate 74 is achieved, the stop plate clamp nut 73 is rotated in a clockwise direction to force the locking finger 77 of the tool setting stop plate locking arm into the groove 75 to temporarily fixedly lock the tool setting stop plate with respect to the main casting 81 of the fixture 80. The poppet valve will then be removed by loosening set screw 85, and the enlarged shank 45 of the tool setting arbor 42 will be positioned as seen in FIG. 15. The tool bits 14, 16 and 18 will then be positioned with respect to the plane stop face 89 in the manner set out in connection with the first form of tool setting fixture.

As in the case of the first form of tool setting fixture, a lap block or tool rest 70 is provided in sliding relationship with respect to a groove 72 in casting 81 to provide for the positioning of each tool bit in exact horizontal alignment with the tool setting arbor axis when its relationship to the plane stop face 89 is being set.

In this second form of the tool setting fixture, a magnet 100 is provided in a holding arm 102, which holding arm is slideably situated on a bar 103 which is integral with and extends upwardly from a portion of casting 81. Means, including a magnet locking set screw 104 is provided for locking the magnet against movement along the bar 103. As best seen in FIG. 15, when the cutting bit, for example bit 16, is properly positioned with respect to the outer edge of plane stop face 89, magnet 100 and its holding arm are slid along bar 103 into contact with bit 16 and are locked in place using magnet locking set screw 104, to hold the cutting bit 16 precisely in position while the means 11 is used to rigidly attach bit 16 to the boring head 12. This procedure is repeated until all three bits are properly positioned.

With the boring head assembly 10 thus positioned to perform a valve seat cut having the desired profile, the boring head will be removed from the arbor 42, the compression coil spring 38 will be placed over the arbor 20 to rest against the cylinder head and the boring head will be mounted on that arbor.

The outside drive means will be connected up as explained above, the spindle 28 will be power rotated and the arm 29 depressed to cause the boring head assembly to move down into cutting relationship with respect to the valve seat region 37 of the cylinder head 24.

Figures 3, 5:
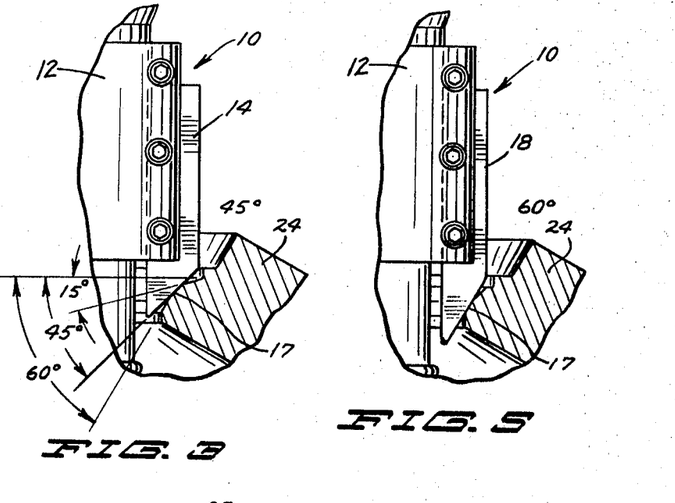
FIG. 3 is an enlarged fragmentary view of the boring head and cylinder head as seen in FIG. 1 but showing a first tool bit in its relationship to the cylinder head as it cuts the valve seat working face.
FIG. 5 is a fragmentary view of the parts as seen in FIGS. 3 and 4 but showing a third tool bit in its relationship to the cylinder head as the tool bit makes a lower clearance cut.
Figure 4:
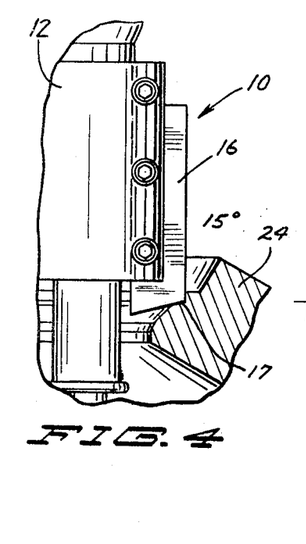
FIG. 4 is a fragmentary view of the parts as seen in FIG. 3 but showing a second tool bit in its relationship to the cylinder head as the tool bit makes an upper clearance cut.

The positioning of each of the first, second and third tool bits on the engine block at the point where the boring or reboring of the valve seat has just been completed is shown in FIGS. 3, 4 and 5 respectively. As clearly shown in FIG. 3, the first tool bit 14 has just completed cutting the valve seat working face which lies, as shown, at 45° with a plane perpendicular to the boring head axis. The second tool bit 16 has completed its clearance cut, and this is shown in FIG. 4. The angle of that clearance cut, as shown, is 15°, and this can clearly be seen from the construction lines in FIG. 3.

FIG. 5 discloses the positioning of third tool bit 15 with respect to the lower clearance cut, and the 60° angular relationship of this cut with respect to a plane perpendicular to the boring head axis is best seen from the construction lines in FIG. 3. Thus it is apparent that the loci of the three tool bits, operating in concentric relationship to the valve stem opening, and against the cylinder head forms a profile defined by a valve working face situated at 45° to the reference plane, and an upper clearance face at 15° to this plane, and a lower clearance face at 60° thereto. It is to be understood that any one or all of these faces could be at other angles or shapes in accordance with the needed clearance and in accordance with the design of the valve with which the tool seat working face is to cooperate.

The invention herein is not limited to use of a flat plate positioned on the tool setting fixture. As long as the proper relationship of a simulated valve seat working face to the boring bar arbor is achieved, tool setting stops of any suitable form can be fixedly positioned with respect to the tool setting fixture. For example, such stops could be constituted as rings simulating all or a portion of the desired valve seat working face and can be, as such, positioned in planes perpendicular to the arbor axis. A rod defining a proper plane stop face can be positioned on, or in an opening provided in, the tool setting fixture.

The embodiments of the invention in which an exclusive property or privilege is claimed are defined as follows:

1. Means for positioning multiple cutting tools with cutting edges in a boring head having a cylindrical arbor opening therethrough and an arbor supported therein so that said head and cutting tools can generate a valve seat face and upper and lower clearance faces concentric with a valve guide opening in an engine casting, said means including:
   A. a tool setting fixture having a main casting or base provided with an arbor support surface, and with an upper horizontal flat plate-receiving surface;
   B. means adapted to temporarily fixedly position said arbor on said support surface to have an arbor axis lying in a horizontal arbor axis plane;
   C. a tool setting stop constituted as a flat tool setting stop plate adjustably supported on the flat plate receiving surface to intersect said arbor axis plane, said stop plate defining a stop trace of the exact width of the valve seat face to be generated, said stop trace being constituted as a plane face defined by truncation of a corner of said stop plate and situated in perpendicular relationship to said horizontal arbor axis plane;
   D. means for fixedly positioning said tool setting stop on said base to establish a relationship between the the stop trace and said arbor axis with the predetermined desired relationship between the desired profile of the valve seat face and the axis of the valve guide opening;
   E. means adapted to successively support each of the boring head cutting tools to position its cutting edge in said arbor axis plane, whereby the stop trace of said tool setting stop is in position to act as a guide to properly align the cutting tools of the boring head, said means including:
      1. a horizontal lap block groove provided in said base and having a plane bottom surface in parallel relation to and below said plate receiving surface, and
      2. a lap block having a first plane surface adapted to rest on the bottom surface of said lap block groove and having a second plane surface parallel to and above its first surface, said second surface being adapted to successively receive the cutting edges of the cutting tools in the horizontal plane of said arbor axis.

2. The combination as specified in claim 1 wherein said means for fixedly positioning said tool setting stop on said base includes indicia and an index provided on said fixture base and on said stop plate for indicating the positioning of a point on said stop face with respect to said arbor axis.

3. Means for use with a tool setting gauge having a stem and a valve face, for positioning multiple cutting tools with cutting edges in a boring head having a cylindrical arbor opening therethrough and an arbor supported therein so that said head and cutting tools can generate a valve seat face and upper and lower clearance faces concentric with a guide opening in an engine casting to have said valve seat face related to the axis of the valve guide opening as the valve face of the setting gauge is related to the axis of the setting gauge stem, said means including:

A. a tool setting fixture having a main casting or base provided with an arbor support surface and with an upper horizontal flat plate-receiving surface;

B. means adapted to:
 1. temporarily fixedly position said arbor on said support surface to have an arbor axis lying in a horizontal arbor axis plane; and
 2. temporarily fixedly position the setting gauge stem on said arbor support surface to have the stem axis coincident with a vertical plane which will be coincident with the location of the arbor axis and parallel to the arbor axis;

C. a tool setting stop constituted as a flat tool setting stop plate adjustably supported on the flat plate receiving surface to intersect said arbor axis plane, said stop plate defining a stop trace of the exact width of the valve seat face to be generated, said stop trace being constituted as a plane face defined by truncation of a corner of said stop plate and situated in perpendicular relationship to said horizontal arbor axis plane, said stop plate having sufficient vertical dimension so that the stop trace will intersect a horizontal plane coincident with the gauge stem axis;

D. means for fixedly positioning said tool setting stop on said base to establish a relationship between the stop trace and said arbor axis with the relationship between the gauge valve face and the gauge stem axis;

E. means adapted to successively support each of the boring head cutting tools to position its cutting edge in said arbor axis plane, whereby the stop trace of said tool setting stop is in position to act as a guide to properly align the cutting tools of the boring head, said means including:
 1. a horizontal lap block groove provided in said base and having a plane bottom surface in parallel relation to and below said plate receiving surface, and
 2. a lap block having a first plane surface adapted to rest on the bottom surface of said lap block groove and having a second plane surface parallel to and above its first surface, said second surface being adapted to successively receive the cutting edges of the cutting tools in the horizontal plane of said arbor axis.

4. The combination as specified in claim 1 and a micrometer extending outwardly from the fixture base on a portion thereof at the opposite side of said tool setting stop plate from said arbor axis, said micrometer and stop plate being so related that said micrometer, when in touch with said stop plate, will indicate the distance of a portion of said stop trace from said arbor axis.

* * * * *